United States Patent
Jang et al.

(10) Patent No.: US 9,452,774 B2
(45) Date of Patent: Sep. 27, 2016

(54) COMPENSATION CONTROL APPARATUS OF MOTOR DRIVEN POWER STEERING SYSTEM

(71) Applicant: HYUNDAI MOBIS CO., LTD., Seoul (KR)

(72) Inventors: Seok Hwan Jang, Suwon-si (KR); Se Wook Oh, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 22 days.

(21) Appl. No.: 14/498,964

(22) Filed: Sep. 26, 2014

(65) Prior Publication Data

US 2015/0321691 A1 Nov. 12, 2015

(30) Foreign Application Priority Data

May 9, 2014 (KR) .................. 10-2014-0055544

(51) Int. Cl.
*B62D 5/04* (2006.01)

(52) U.S. Cl.
CPC ........... *B62D 5/0463* (2013.01); *B62D 5/0409* (2013.01)

(58) Field of Classification Search
CPC .................................... B62D 5/0462

USPC .......................................... 180/446
See application file for complete search history.

(56) References Cited

U.S. PATENT DOCUMENTS

| 5,732,373 A * | 3/1998 | Endo ................. B62D 5/0463 180/443 |
| 2005/0182541 A1* | 8/2005 | Tamaizumi ........... B62D 5/046 701/41 |
| 2012/0175183 A1* | 7/2012 | Sakaguchi ........... B62D 5/0472 180/446 |

FOREIGN PATENT DOCUMENTS

KR 10-2013-0011840 A 1/2013

* cited by examiner

*Primary Examiner* — Tony Winner

(74) *Attorney, Agent, or Firm* — Knobbe Martens Olson & Bear LLP

(57) ABSTRACT

A compensation control apparatus of motor driven power steering may include: a torque sensor for measuring a driver's column torque inputted to a steering wheel; and a controller for generating an assist torque based on the column torque measured through the torque sensor, compensating for a phase margin in a low-frequency band for the generated assist torque, detecting a resonance frequency to attenuate resonance, and outputting a final assist torque.

7 Claims, 6 Drawing Sheets

COMPENSATION CONTROL APPARATUS OF MOTOR DRIVEN POWER STEERING SYSTEM

CROSS-REFERENCES TO RELATED APPLICATIONS

The present application claims priority to Korean application number 10-2014-0055544, filed on May 9, 2014, which is incorporated by reference in its entirety.

BACKGROUND

The present disclosure relates to a compensation control apparatus of a motor driven power steering (MDPS) system, and more particularly, to a compensation control apparatus of an MDPS system, which is capable of compensating for response reduction and delay in a low-frequency band, caused by a notch filter, while the MDPS system determines an assist torque on the basis of a boost output depending on vehicle speed and column torque.

An MDPS system refers to a device which converts a torque, generated while a driver turns a steering wheel, into an actual output to steer a vehicle.

The MDPS system may be divided into C-MDPS, P-MDPS, and R-MDPS systems, depending on how to control steering. Among them, the C-MDPS system generates an assist thrust through a motor mounted on a column shaft. Thus, each high-level logic generates a proper command value.

The related art is disclosed in Korean Patent Laid-open Publication No. 10-2013-0011840 published on Jan. 30, 2013, and entitled "Steering control device of MDPS system".

SUMMARY

Embodiments of the present invention are directed to a compensation control apparatus of an MDPS system, which passes an assist torque through a lead filter and a stabilization filter which are cascade-connected to each other, when determining the assist torque on the basis of a boost output depending on vehicle speed and column torque in the MDPS system, thereby compensating for response reduction and delay in a low-frequency band, caused by a stabilization filter.

In one embodiment, a compensation control apparatus of motor driven power steering may include: a torque sensor for measuring a driver's column torque inputted to a steering wheel; and a controller for generating an assist torque based on the column torque measured through the torque sensor, compensating for a phase margin in a low-frequency band for the generated assist torque, detecting a resonance frequency to attenuate resonance, and outputting a final assist torque.

The compensation control apparatus may further include a vehicle speed sensor for measuring vehicle speed. The controller may generate the assist torque based on the column torque and the vehicle speed measured through the vehicle sensor.

The controller may generate the assist torque to decrease in proportion to the vehicle speed.

The controller may include: a boost unit for generating the assist torque by applying a gain based on the column torque and the vehicle speed; a lead filter for compensating for the phase margin in the low-frequency band for the generated assist torque; and a stabilization filter for detecting the resonance frequency to attenuate resonance.

The stabilization filter may include a band reject filter (BRF).

The BRF may include a notch filter.

A compensation frequency of the lead filter may be determined in response to a notch frequency of the notch filter.

The compensation frequency of the lead filter may be determined to be a smaller value than the notch frequency of the notch filter.

The controller may further include a high-frequency compensator for compensating for a gain in a high-frequency band.

The lead filter and the stabilization filter are cascade-connected to each other.

In accordance with the embodiments of the present invention, the compensation control apparatus of an MDPS system may pass an assist torque through the lead filter and the stabilization filter which are cascade-connected to each other, while determining the assist torque on the basis of a boost output depending on vehicle speed and column torque in the MDPS system, thereby compensating for response reduction and delay which may be caused by the stabilization filter implemented with a notch filter.

Furthermore, as a gain and phase margin in a low-frequency band are secured through the lead filter, static friction and dynamic friction may be reduced to provide a smooth on-center steering feel during a startup, and the inertia torque may be reduced by the inertia effect of the end stage during reverse steering. Furthermore, during lane-change steering input, the hysteresis may be reduced around the on-center steering section. Thus, the connection of efforts is light and smooth on the whole, and thus a smooth steering feel may be provided. Furthermore, with the decrease of friction, the degree of fatigue may be reduced during a long-term operation.

Furthermore, the lead filter may be used to compensate for a phase margin in a low-frequency band, offset by the stabilization filter. Thus, since the function of the stabilization filter is optimally maintained and the increase of gain in a high-frequency band is minimized, compensation in a high-frequency band in which vibration is highly likely to occur may be adjusted to secure a sufficient phase margin while avoiding vibration.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Main assist logic for generating an assist torque may include boost logic, and have a structure that receives vehicle speed and column torque and passes the received vehicle speed and column torque through a boost curve and a stabilization filter.

Such a stabilization filter serves to reduce vibration ripple caused by resonance and noise. However, since the stabilization filter is implemented in the form of a notch filter, the stabilization filter covers a wide section. Thus, the stabilization filter may operate even in a low-frequency band of about 1 Hz corresponding to a main steering section, thereby causing system response reduction and delay.

That is, when the stabilization filter is applied, a loss of assist compensation for the low-frequency band inevitably occurs, in order to remove system resonance. Thus, the development of compensation logic for compensating for a phase margin in the low-frequency band is required, in order to stabilize the MDPS system while maintaining the main function of the stabilization filter.

Figure 1:
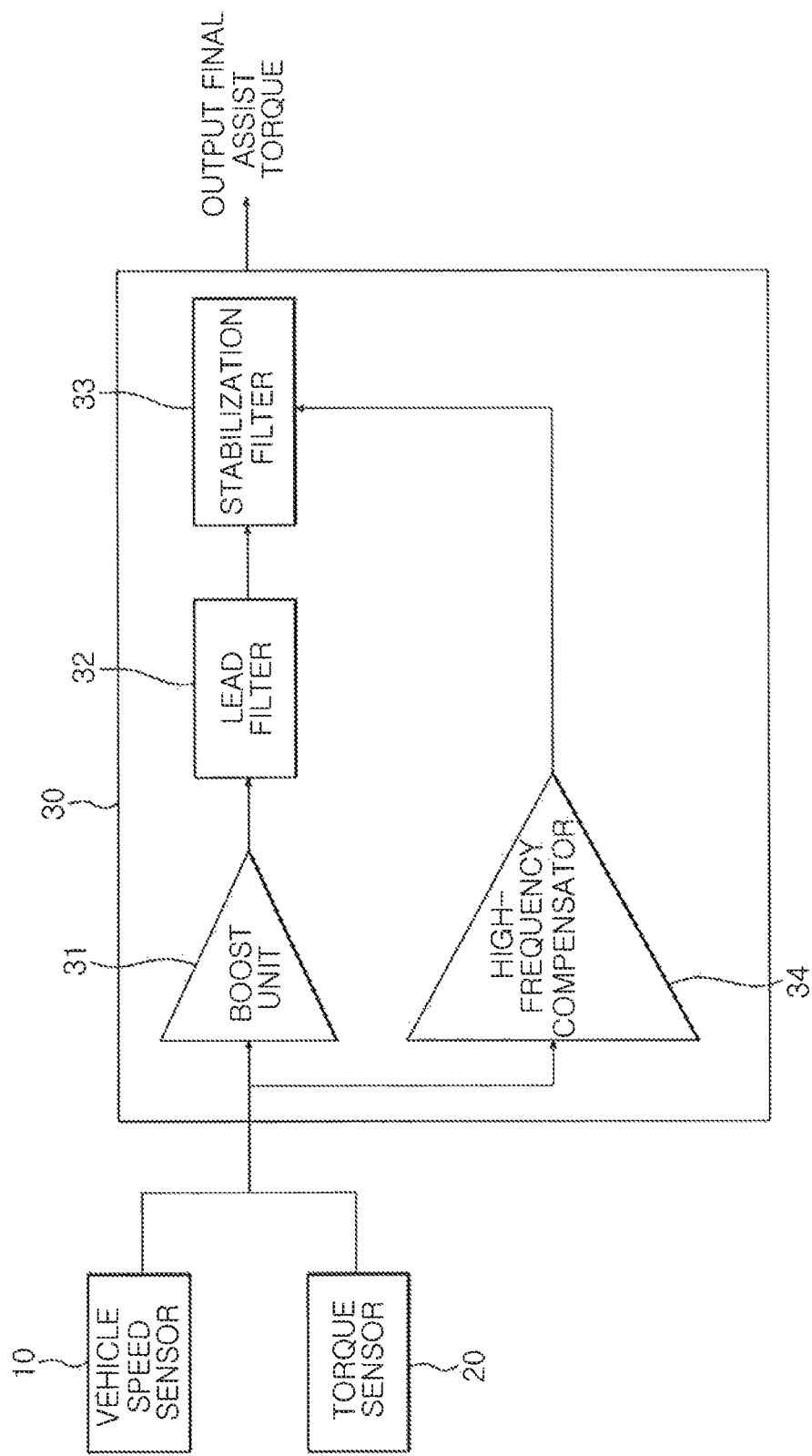
FIG. 1 is a block configuration diagram illustrating a compensation control apparatus of an MDPS system in accordance with an embodiment of the present invention.

FIG. 1 is a block configuration diagram illustrating a compensation control apparatus of a motor driven power steering (MDPS) system in accordance with an embodiment of the present invention.

As illustrated in FIG. 1, the compensation control apparatus of MDPS in accordance with the embodiment of the present invention includes a vehicle speed sensor 10, a torque sensor 20, and a controller 30.

The vehicle speed sensor 10 measures the speed of a vehicle.

The torque sensor 20 measures a column torque of a driver, inputted to a steering wheel (not illustrated), and senses the driver's steering intention.

The controller 30 outputs a final assist torque through a boost unit 31, a lead filter (or lead compensator) 32, and a stabilization filter 33. The boost unit 31 receives the vehicle speed and the column torque from the vehicle sensor 10 and the torque sensor 20, respectively, and generates an assist torque by applying a gain based on the vehicle speed and the column torque. The lead filter 32 compensates for a phase margin in a low-frequency band for the generated assist torque. The stabilization filter 33 detects a resonance frequency to attenuate resonance.

Specifically, the boost unit 31 generates the assist torque by applying the gain such that the assist torque decreases in proportion to the vehicle speed. Thus, when handling the steering wheel, the driver may feel that the steering wheel gradually becomes heavy, with the increase of the vehicle speed.

That is, when the vehicle is parked or operated at low speed, the boost unit 31 generates a large assist torque to assist the driver, thereby saving the driver's force. Furthermore, when the vehicle is operated at high speed, the boost unit 31 generates a small assist torque to assist the driver, thereby maintaining the stability of the vehicle body.

Furthermore, the lead filter 32 serves to improve response speed with a phase margin, in order to compensate for a loss for assist compensation in the low-frequency band. Thus, the lead filter 32 is cascade-connected to the stabilization filter 33.

That is, in order to independently improve a normal state response when an assist torque is generated according to the driver's steering, the lead filter 32 in accordance with the embodiment of the present invention is not feedback-connected, but cascade-connected to the stabilization filter 33, thereby simply compensating for response reduction and delay.

In particular, the lead filter 32 is positioned at an input stage of the stabilization filter 33, and has a compensation frequency to compensate for a phase margin in response to the frequency of the stabilization filter 33.

Specifically, since the lead filter 32 has a smaller value than the frequency of the stabilization filter 33, the lead filter 32 may compensate for the margin for phase in the low-frequency band where steering is performed.

At this time, the stabilization filter 33 is a band reject filter (BRF) to reject only a signal in a specific frequency band. In the present embodiment, the stabilization filter 33 may include a notch filter.

In the present embodiment, the controller 30 includes a high-frequency compensator 34 to compensate for a gain in a high-frequency band, thereby solving a problem in which the gain in the high-frequency band decreases when a strong electric field is applied to the boost unit 31 so as not to amplify a signal.

In the present embodiment, as the lead filter 32 is added to be cascade-connected to the stabilization filter 33, it is possible to compensate for response reduction and delay which may occur when the stabilization filter 33 is applied.

Figure 2:
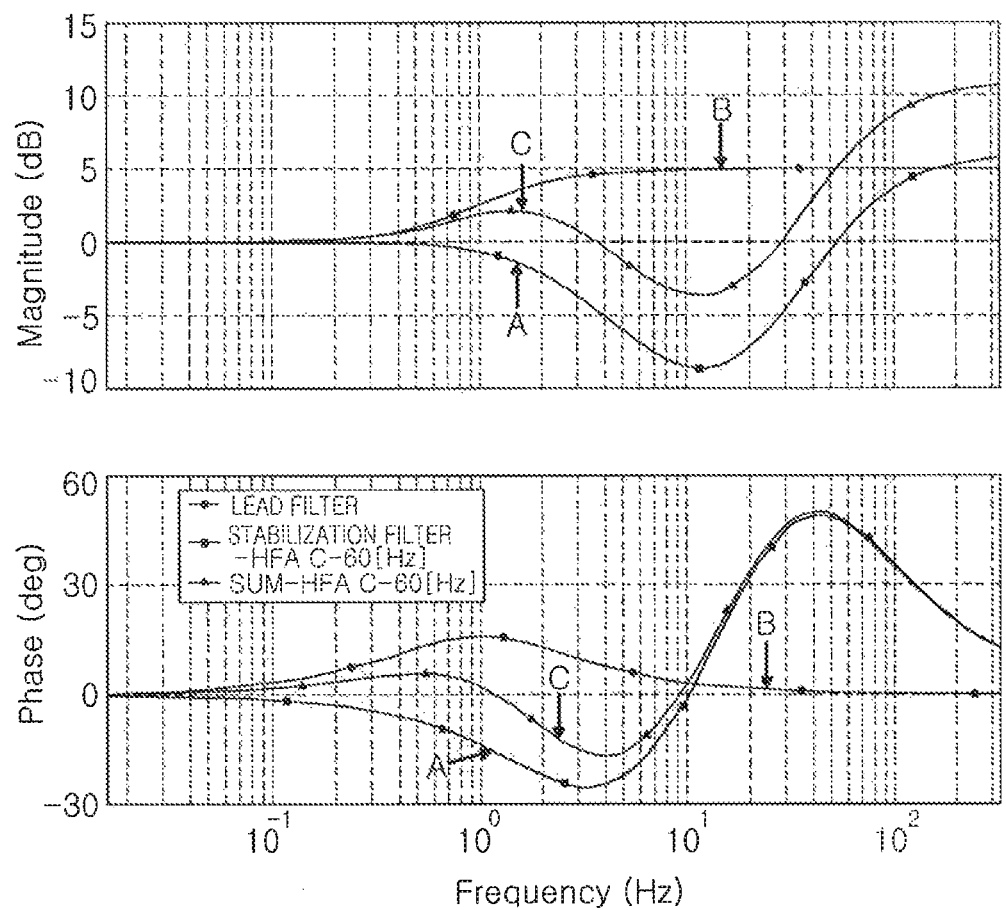
FIG. 2 is a graph illustrating frequency changes which occur when a lead filter of the compensation control apparatus of an MDPS system in accordance with the embodiment of the present invention is applied.

FIG. 2 is a graph illustrating frequency changes which occur when the lead filter of the compensation control apparatus of an MDPS system in accordance with the embodiment of the present invention is applied.

FIG. 2 illustrates a vehicle test result. In FIG. 2, a graph A may be obtained by applying a high-frequency compensation gain HFAC to the stabilization filter 33. At this time, the stabilization filter 33 forms a notch point around 12 Hz band, and has the shape of a secondary filter through the pole and zero of an optimized system.

Thus, in the MDPS system having the 12 Hz-band stabilization filter 33, the gain and phase in a low-frequency range of 1 Hz may be affected in order to avoid the resonance mode. As a result, the compensation rate in the low-frequency range may decrease to remove a considerable portion of the assist torque calculated through the boost unit 31.

In FIG. 2, a graph B illustrates the lead filter 32 to compensate for a phase margin in the 1 Hz band. The reason to compensate for a phase margin the 1 Hz band is that the 1 Hz band corresponds to speed at which the vehicle is frequently steered when the vehicle is suddenly steered, and the compensation for the assist torque reduced by the stabilization filter 33 is the most necessary.

In FIG. 2, a graph C illustrates the case in which the lead filter 32 and the stabilization filter 33 are applied together. The graph C indicates that a phase margin of 15° or more is secured. Specifically, while the notch function is performed on the resonance band around 10 Hz, the compensation for the 1~2 Hz band reduced by the notch function may be strengthened to secure the phase margin.

Figure 3:
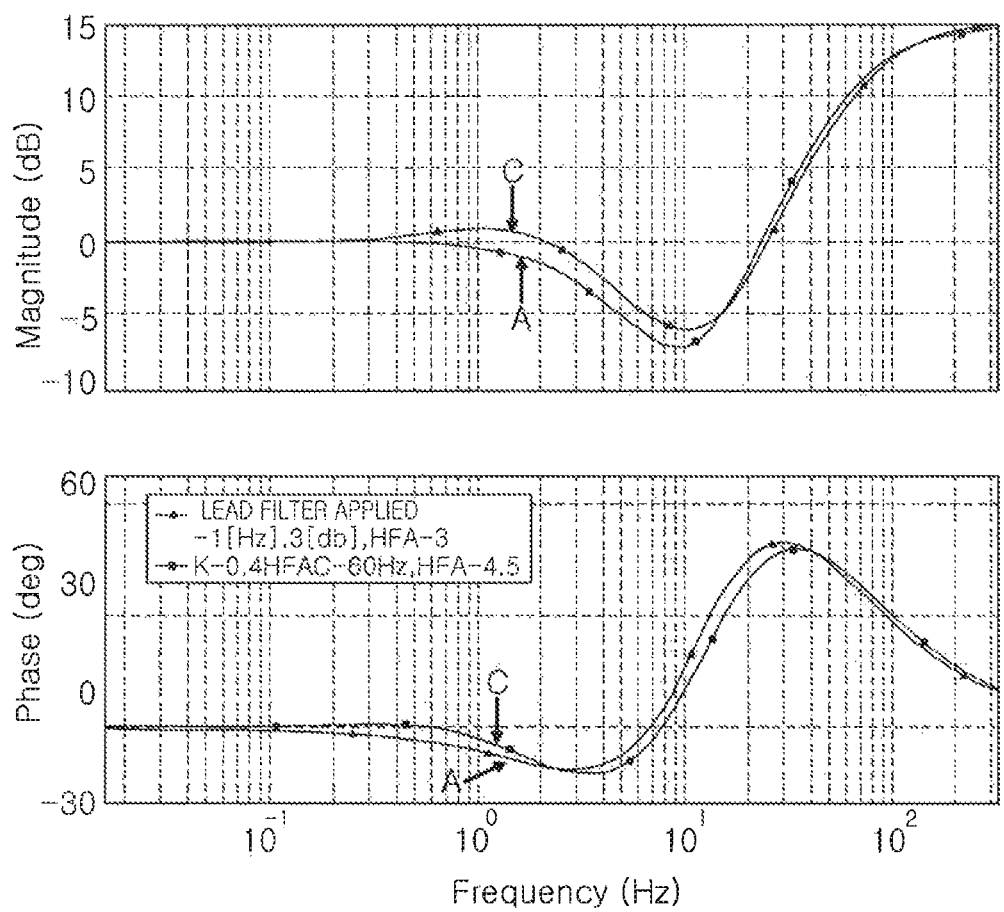
FIG. 3 is a graph comparatively illustrating performances before and after the lead filter of the compensation control apparatus of an MDPS system in accordance with the embodiment of the present invention is applied.

FIG. 3 is a graph comparatively illustrating performances before and after the lead filter of the compensation control apparatus of an MDPS system in accordance with the embodiment of the present invention is applied.

Through a vehicle test, a result A and a result C were compared. The result A may be obtained by promoting performance to compensate for a gain and phase in a low-frequency band based on logic which is previously implemented in the MDPS system, and the result C may be obtained by applying the lead filter 32.

Referring to FIG. 3, the result A is a result which is optimized to secure a gain and phase margin of the MDPS system by adjusting a high-frequency compensation gain of the high-frequency compensator 34 and the components (pole and zero) of the stabilization filter 33. According to the result, the compensation gain and the cut-off frequency of the high-frequency filter may be maximized in such a range that vibration does not occur, and the notch range of the stabilization filter 33 may be minimized, which indicates that the MDPS system has more excellent performance than a general MDPS system. In terms of a phase margin, however, the result A shows an unsatisfactory effect in comparison to the result C obtained by applying the lead filter 32. In particular, it is impossible for the MDPS system to have a phase margin and gain of 0 dB or more in a low-frequency band of about 1 Hz.

Figure 4:
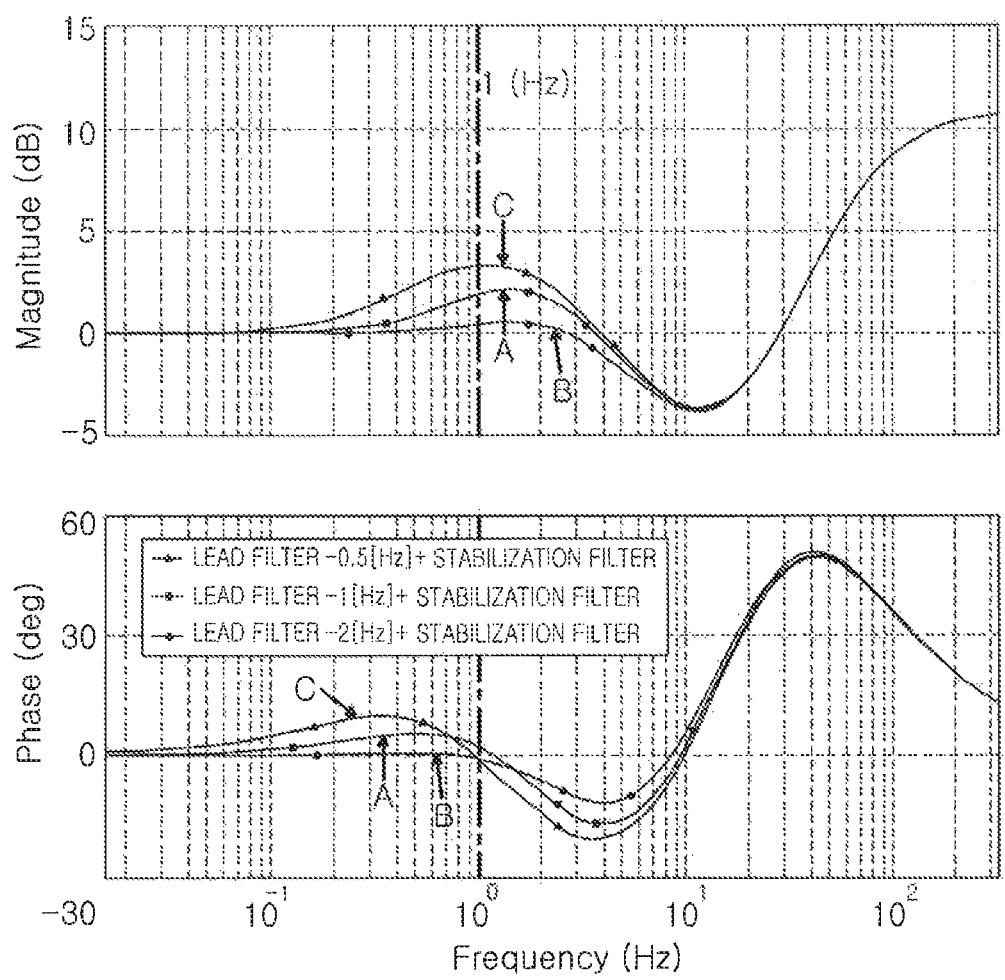
FIG. 4 is a graph comparatively illustrating performances depending on frequency bands to which the lead filter of the compensation control apparatus of an MDPS system in accordance with the embodiment of the present invention is applied.

FIG. 4 is a graph comparatively illustrating performances depending on frequency bands to which the lead filter of the compensation control apparatus of an MDPS system in accordance with the embodiment of the present invention is applied.

FIG. 4 illustrates a vehicle test result. In FIG. 4, a graph C illustrates a result obtained by applying the 0.5 Hz-band lead filter 32 to the stabilization filter 33. The result illustrated by the graph C shows that an effective phase margin is acquired in a low-frequency band of less than 1 Hz, but a phase margin is relatively reduced in a band of 1 Hz or more. Furthermore, a graph B illustrates a result obtained by applying a 2 Hz-band lead filter 3 to the stabilization filter 33, and shows that the effect thereof is unsatisfactory on the whole. Furthermore, a graph A illustrates a result obtained by applying a 1 Hz-band lead filter 32 to the stabilization filter 33, and shows that the effect thereof is the most excellent in terms of the phase margin.

As described above, the optimal compensation frequency of the lead filter 32 is determined in response to the notch frequency of the stabilization filter 33, and the 1 Hz-band lead filter 32 does not always exhibit the optimal effect.

Figure 5:
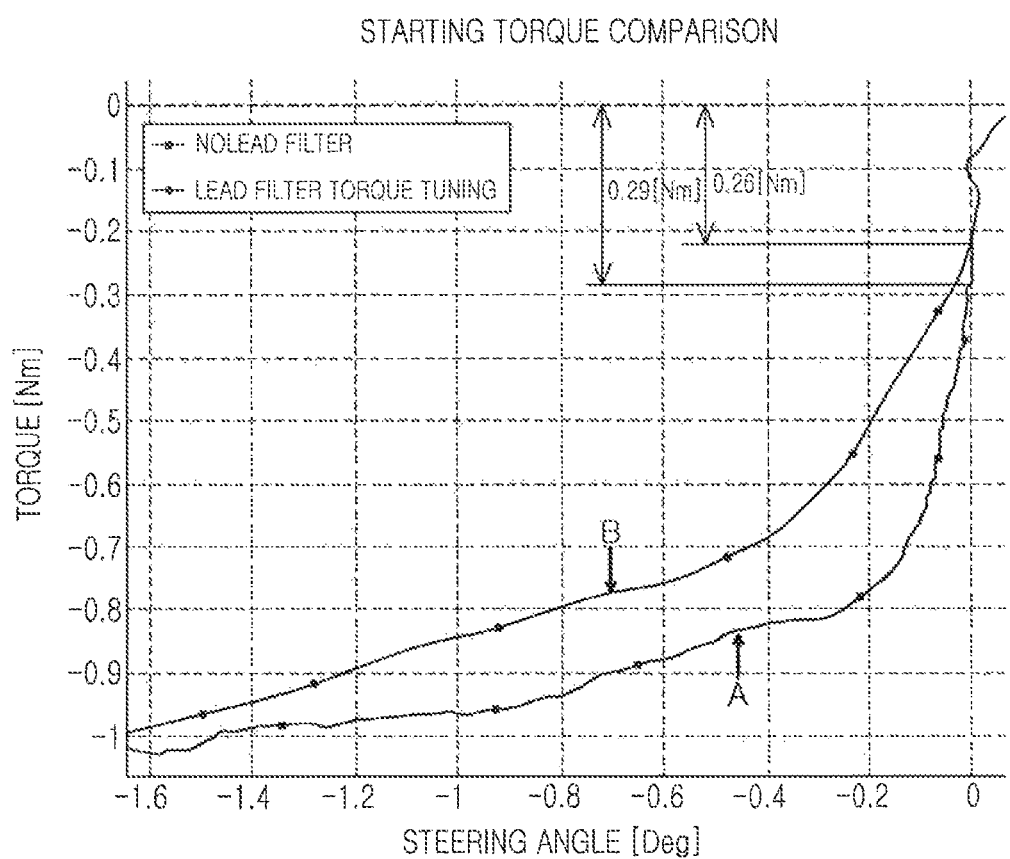
FIG. 5 is a graph comparatively illustrating starting torques before and after the lead filter of the compensation control apparatus of an MDPS system in accordance with the embodiment of the present invention is applied.
Figure 6:
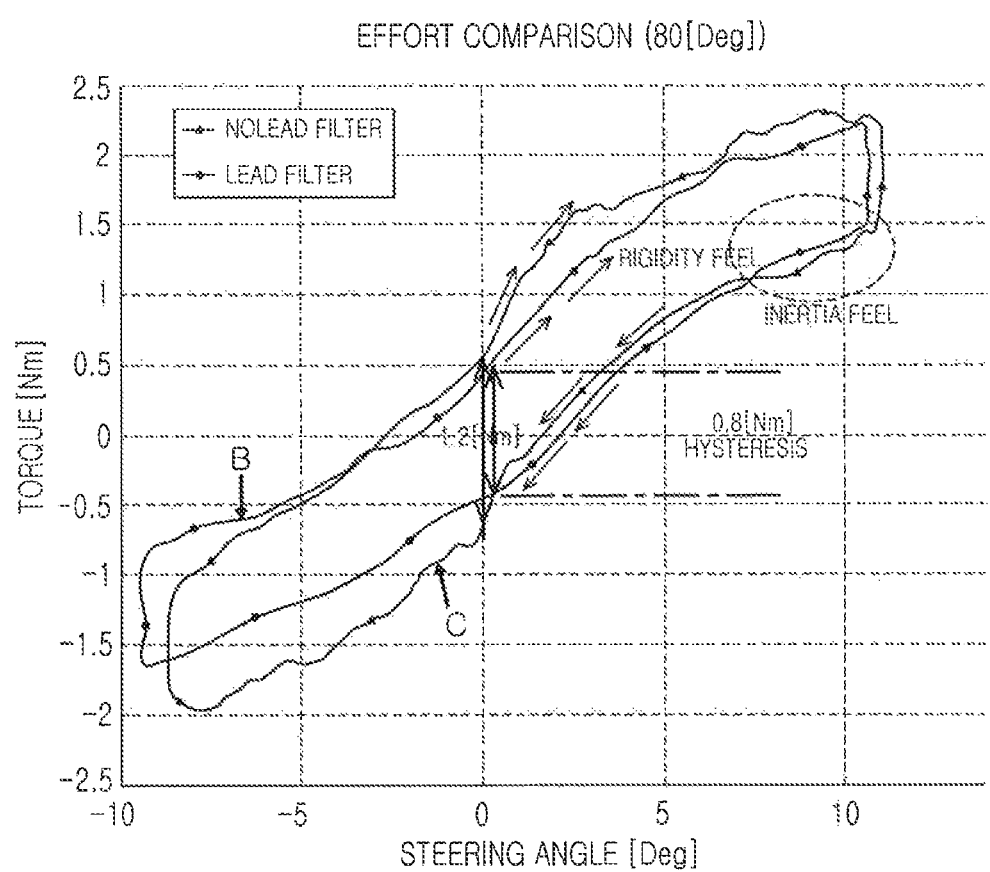
FIG. 6 is a graph illustrating efforts before and after the lead filter of the compensation control apparatus of an MDPS system in accordance with the embodiment of the present invention is applied.

FIG. 5 is a graph comparatively illustrating starting torques before and after the lead filter of the compensation control apparatus of an MDPS system in accordance with the embodiment of the present invention is applied. FIG. 6 is a graph illustrating efforts before and after the lead filter of the compensation control apparatus of an MDPS system in accordance with the embodiment of the present invention is applied.

FIG. 5 illustrates a vehicle test result. In FIG. 5, a graph B illustrates the case after the lead filter 32 is applied, and a graph A illustrates the case before the lead filter 32 is applied. As illustrated in FIG. 5, when the lead filter 32 is applied, the slope of static friction and dynamic friction in an on-center steering section decreases by about 10% in comparison to before the lead filter 32 is applied. Thus, the starting torque may be reduced.

FIG. 6 illustrates a vehicle test result. As illustrated in FIG. 6, when the lead filter 32 is applied as indicated by a graph B, an inertia feel in a minute steering section (less than about 10 degrees) may be reduced. The inertia feel may indicate a feel applied when the steering wheel is reversely turned.

In terms of effort, when the lead filter 32 is applied as indicated by the graph B, the hysteresis may be reduced by about 30% in comparison to before the lead filter 32 is applied. Furthermore, since the connection of efforts is further smoothed, a smooth steering feel may be acquired, and a sense of difference may be minimized. Thus, the lead filter 32 may be applied to a proper low-frequency band, in order to increase a gain and phase margin in the MDPS system.

As described above, the compensation control apparatus of an MDPS system in accordance with the embodiment of the present invention may pass an assist torque through the lead filter and the stabilization filter which are cascade-connected to each other, while determining the assist torque on the basis of a boost output depending on vehicle speed and column torque in the MDPS system, thereby compensating for response reduction and delay which may be caused by the stabilization filter implemented with a notch filter.

Furthermore, as a gain and phase margin in a low-frequency band are secured through the lead filter, static friction and dynamic friction may be reduced to provide a smooth on-center steering feel during a startup, and the inertia torque may be reduced by the inertia effect of the end stage during reverse steering. Furthermore, during lane-change steering input, the hysteresis may be reduced around the on-center steering section. Thus, the connection of efforts is light and smooth on the whole, and thus a smooth steering feel may be provided. Furthermore, with the decrease of friction, the degree of fatigue may be reduced during a long-term operation.

Furthermore, the lead filter may be used to compensate for a phase margin in a low-frequency band, offset by the stabilization filter. Thus, since the function of the stabilization filter is optimally maintained and the increase of gain in a high-frequency band is minimized, compensation in a high-frequency band in which vibration is highly likely to occur may be adjusted to secure a sufficient phase margin while avoiding vibration.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An apparatus of motor driven power steering for an automobile, comprising:
    a torque sensor configured to sense a column torque inputted to a steering wheel, wherein the column torque comprises a 1 Hz frequency component;
    a booster configured to generate a torque signal based on the column torque from the torque sensor;
    a lead compensator configured to adjust the torque signal to provide a modified torque signal such that adjusting the torque signal advances a phase of the torque signal's frequency component at 1 Hz and increases a magnitude of the torque signal's frequency component at 1 Hz; and a stabilization filter configured to adjust the modified torque signal from the lead compensator to provide a stabilized torque signal such that adjusting the modified torque signal decreases a magnitude of the modified torque signal's frequency component at a resonance frequency of the apparatus, wherein adjusting the modified torque signal at the stabilization filter causes changes in other frequency components of the modified torque signal including a 1 Hz frequency component thereof such that a magnitude of the modified torque signal's 1 Hz frequency component is decreased and a phase of the modified torque signal's 1 Hz frequency component is delayed, wherein adjusting the torque signal at the lead compensator pre-compensates the changes by the stabilization filter in the magnitude and phase of the modified torque signal's 1 Hz frequency component.

2. The apparatus of claim 1, wherein the booster generates the torque signal further based on a speed of the automobile.

3. The apparatus of claim 2, wherein the torque signal decreases in proportion to the vehicle speed.

4. The apparatus of claim 1, wherein the resonance frequency of the apparatus is higher than 1 Hz.

5. The apparatus of claim 1, wherein the stabilization filter comprises a band reject filter (BRF).

6. The apparatus of claim 5, wherein the band reject filter comprises a notch filter.

7. The apparatus of claim 1, further comprising a high-frequency compensator configured to amplify the torque signal's frequency component at a frequency higher than the resonance frequency.

* * * * *